United States Patent [19]

Buitekant et al.

[11] Patent Number: 4,523,731

[45] Date of Patent: Jun. 18, 1985

[54] EXTERNAL STORE RELEASE FOR FLIGHT VEHICLE

[75] Inventors: Alan Buitekant, Kent; David M. Dolliver, Bellevue, both of Wash.

[73] Assignee: The Boeing Company, Seattle, Wash.

[21] Appl. No.: 536,893

[22] Filed: Sep. 28, 1983

[51] Int. Cl.³ .............................................. B64D 1/12
[52] U.S. Cl. ............................ 244/137 R; 294/82.28; 24/603; 24/453; 24/607
[58] Field of Search ............... 244/137 R, 137 A; 24/603, 606, 607, 663, 453, 574, 590, 591; 292/201, 252, 144; 294/83 R, 83 A, 83 AA, 83 AB; 89/1.5 C, 1.5 H

[56] References Cited

U.S. PATENT DOCUMENTS

| | | | |
|---|---|---|---|
| 2,593,662 | 4/1952 | Dickinson | 292/300 |
| 2,726,576 | 12/1955 | Musser | 244/137 A |
| 2,816,471 | 12/1957 | Bachman | 24/453 |
| 2,885,893 | 5/1959 | Lane et al. | 74/2 |
| 3,396,924 | 8/1968 | Kriesel | 244/137 |
| 3,430,305 | 3/1969 | Geffner | 24/603 |
| 3,753,316 | 8/1973 | Savarieau et al. | 49/31 |
| 3,883,097 | 5/1975 | Billot | 244/137 |
| 3,887,150 | 6/1975 | Jakubowski, Jr. | 244/137 A |
| 3,942,828 | 3/1976 | Bourrie et al. | 292/201 |
| 3,980,327 | 9/1976 | Duran | 292/252 |
| 4,071,271 | 1/1978 | Bourrie et al. | 292/201 |
| 4,108,081 | 8/1978 | Blanz | 24/603 |
| 4,111,477 | 9/1978 | Rigali | 292/252 |
| 4,120,232 | 10/1978 | Hoffman, Jr. | 89/1.5 |
| 4,132,147 | 1/1979 | Contaldo | 244/137 A |
| 4,168,047 | 9/1979 | Hasquenoph et al. | 244/137 |
| 4,231,670 | 11/1980 | Knoski | 403/11 |

Primary Examiner—Trygve M. Blix
Assistant Examiner—Rodney Corl
Attorney, Agent, or Firm—Joan H. Pauly

[57] ABSTRACT

The inner end of a hollow shaft (12) is releasably attached to a flight vehicle (2) by a ball-plunger type quick release mechanism. A rod (22) is axially slidable in the shaft (12) to release the shaft (12) from the vehicle (2). A plate (34) extends radially from the outer end (16) of the shaft (12) and abuts an outwardly facing surface of an external store (4) through which the shaft (12) and the rod (22) extend. The rim (48) of a cup-shaped retainer (42) interlocks with plate (34) to rotatably secure retainer (42) to plate (34). A solenoid (52) engages an arm (44) on retainer (42) to rotate retainer (42), release the interlocking engagement, and allow a spring (68) to move the retainer (42) axially outwardly. Retainer (42) contacts a shoulder (74) on rod (22) to move rod (22) axially outwardly. This releases shaft (12) from vehicle (2) and allows shaft (12) and store (4) to be separated from vehicle (2).

19 Claims, 5 Drawing Figures

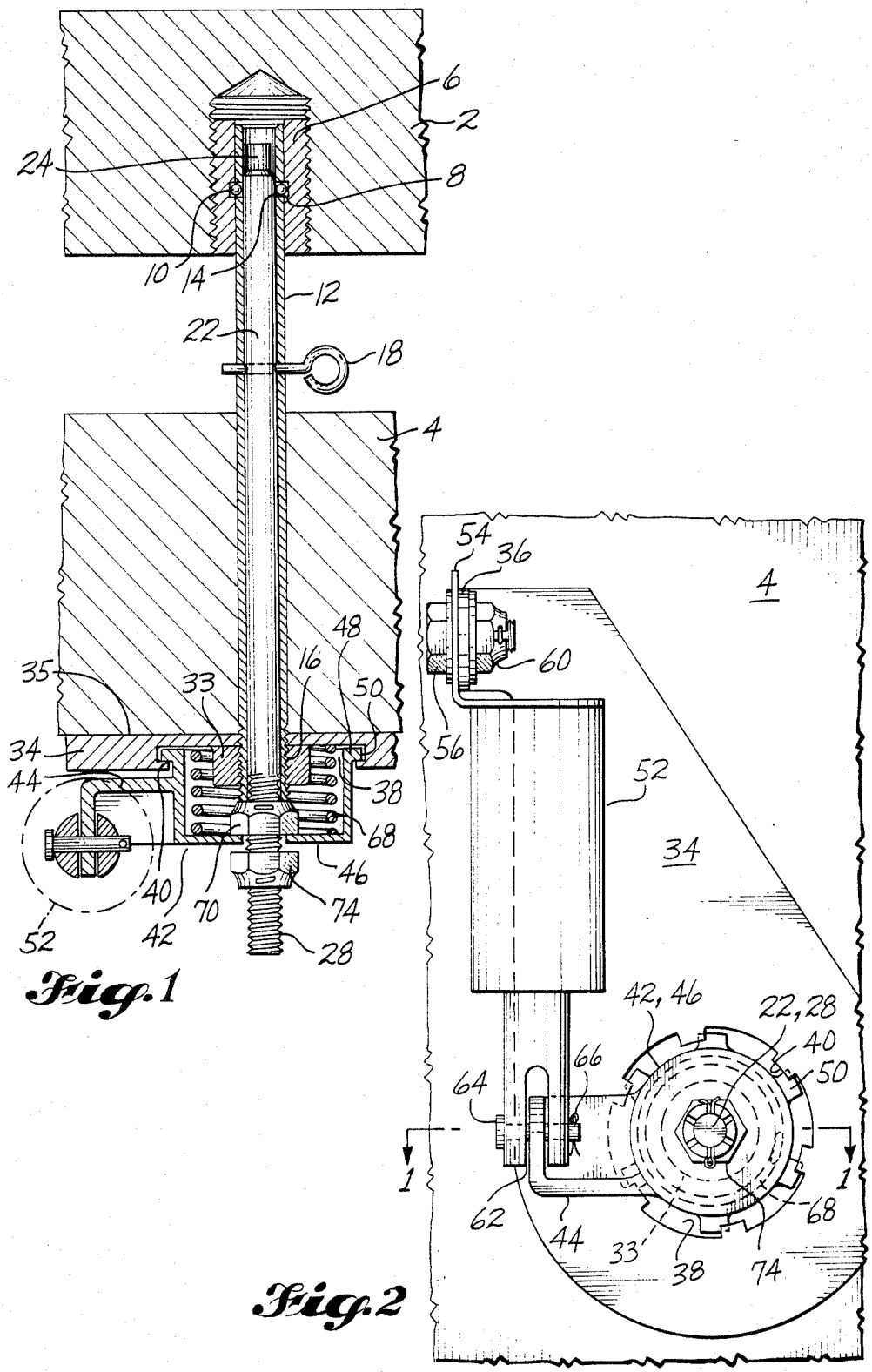

EXTERNAL STORE RELEASE FOR FLIGHT VEHICLE

DESCRIPTION

1. Technical Field

This invention relates to apparatus for securing an external store to a flight vehicle and for releasing such store to permit separation from the vehicle and, more particularly, to such apparatus that will release upon command, that can carry the shear due to acceleration loads and drag loads on the store, and that may be thoroughly tested before use.

2. Background Art

As is well known in the art, there are many situations in which it is necessary for a flight vehicle to carry an external store and for the external store to be separable from the flight vehicle forcefully upon command. The forceful separation may be accomplished by a variety of means, including the use of a compressed spring, explosive charge, compressed gas, or a combination of these means, for providing the separating impetus to move the store away from the flight vehicle. During the period of the operation of the flight vehicle before the ejection of the external store, the store must be held securely to the flight vehicle by some type of fastening means. Such a fastening means must of course be able to carry the loads experienced by the store, in particular the shear resulting from acceleration loads and drag-type loads on the store. In addition to carrying these loads, the fastening means must be releasable upon command to permit the separation of the store from the flight vehicle.

Previous attempts to solve the problem of providing fastening means with the necessary characteristics have centered around the use of an explosively severed bolt. This approach has the very serious disadvantage of not being subject to adequate testing for satisfactory operation prior to the actual firing to sever the bolt. Such testing is of course highly desirable since a malfunction in the release of the fastening means could seriously interfere with the operation of the flight vehicle and possibly create a dangerous situation. In addition, a malfunction could cause damage to the store which in some cases might be a very expensive, hard-to-replace item. In situations in which the purpose of the flight vehicle is to deliver the store to a predesignated location, failure of the store to be properly released would of course tend to defeat the purpose of the flight.

The following United States patents each disclose apparatus for releasably securing one body to another, which apparatus includes a ball retention device that releases in response to movement of a piston or plunger: U.S. Pat. No. 2,593,662, granted Apr. 22, 1952, to H. R. Dickinson; U.S. Patent No. 2,885,893, granted May 12, 1959, to J. A. Lane et al.; U.S. Pat. No. 3,396,924, granted Aug. 13, 1968, to M. S. Kriesel; U.S. Pat. No. 3,753,316, granted Aug. 21, 1973, to H. Savarieau et al.; U.S. Pat. No. 3,883,097, granted May 13, 1975, to J. Billot; U.S. Pat. No. 3,942,828, granted Mar. 9, 1976, to G. E. Bourrie et al.; U.S. Pat. No. 3,980,327, granted Sept. 14, 1976, to J. A. Duran; U.S. Pat. No. 4,071,271, granted Jan. 31, 1978, to G. E. Bourrie et al.; U.S. Pat. No. 4,111,477, granted Sept. 5, 1978, to P. D. Rigali; U.S. Pat. No. 4,120,232, granted Oct. 17, 1978, to C. R. Hoffman, Jr.; U.S. Pat. No. 4,168,047, granted Sept. 18, 1979, to J. H. Hasquenoph et al.; and U.S. Pat. No. 4,231,670, granted Nov. 4, 1980, to J. L. Knoski Hoffman, Jr., U.S. Pat. No. 4,120,232, and Hasquenoph et al., U.S. Pat. No. 4,168,047, each disclose a device in which a store is attached to an aircraft by trapping balls between a movable piston carried by the aircraft and a lug attached to the store. Billot, U.S. Pat. No. 3,883,097, and Kriesel, U.S. Pat. No. 3,396,924, each disclose a device for securing a load carried inside an aircraft. The releasable connection between the store and aircraft is provided by trapping balls between a movable piston-like member carried by the aircraft and a portion of the store. Lane et al., U.S. Pat. No. 2,885,893, Savarieau et al., U.S. Pat. No. 3,753,316, Bourrie et al., U.S. Pat. No. 3,942,828, Bourrie et al., U.S. Pat. No. 4,071,271, and Hoffman, Jr., U.S. Pat. No. 4,120,232, each disclose a device in which a solenoid is employed to move a piston to release a ball retention mechanism. In each of the five disclosures, except Bourrie et al., U.S. Pat. No. 4,071,271, the solenoid moves the piston directly or by means of a lever. In Bourrie et al., U.S. Pat. No. 4,071,271, the solenoid is a release mechanism that releases a lever to in turn allow a spring to move the lever and a piston. Dickinson U.S. Pat. No. 2,593,662, discloses a door latch in which a cam member is turned manually to move a piston upwardly to in turn release a ball gripping mechanism.

The above patents and the prior art that is discussed and/or cited therein should be studied for the purpose of putting the present invention into proper perspective relative to the prior art.

DISCLOSURE OF THE INVENTION

A subject of this invention is apparatus for releasably securing an external store to a flight vehicle. According to a basic aspect of the invention, the apparatus comprises a sliding member and support means for supporting the external store in position relative to the flight vehicle. An inner end portion of the support means is releasably attached to the flight vehicle. The sliding member is slidable relative to the support means to release the support means from the flight vehicle. The apparatus also includes engaging means carried by an outer portion of the support means, and a retainer. The retainer has a lock position in which a portion of the retainer interlocks with said engaging means to rotatably secure the retainer to the engaging means, and a free position in which the retainer is free to move axially away from the engaging means. Spring means is provided for biasing the retainer axially away from the engaging means. Positioning means prevents sliding movement of the sliding member relative to the support means when the retainer is secured to the engaging means. Shoulder means is carried by the sliding member in the axial path of the retainer. Actuating means rotates the retainer from its lock position to its free position to allow the spring means to move the retainer axially away from the engaging means. When the spring means moves the retainer, the retainer contacts the shoulder means and moves the sliding member to release the support means and allow the support means and the external store to separate from the flight vehicle.

According to an aspect of the invention, said outer portion of the support means comprises a radially-extending flange that has a radial abutting surface facing inwardly for abutting an outer surface of the external store. The engaging means is positioned on the flange opposite this abutting surface.

According to another aspect of the invention, one of the engaging means and the portion of the retainer that interlocks with the engaging means comprises a plurality of radially-extending, circumferentially-spaced tabs. The other of the engaging means and said portion of the retainer comprises a plurality of radially-extending, cicumferentially-spaced lip portions. The tabs and the lip portions are aligned when the retainer is in its lock position.

According to still another aspect of the invention, the retainer is generally cup-shaped and has a hollow interior into which the sliding member extends. Preferably, the retainer has a bottom portion with an axial hole extending therethrough through which the sliding member extends, and the shoulder means is in the axial path of said bottom portion.

According to a preferred aspect of the invention, the spring means comprises a coil spring positioned inside the retainer surrounding the sliding member. One end of this coil spring is urged against the bottom portion of the retainer, and the other end of the coil spring is urged against a radially-extending flange that carries the engaging means.

According to another preferred aspect of the invention, the engaging means comprises an annular recess and a plurality of radially-extending, circumferentially-spaced lip portions extending into this recess. The portion of the retainer that interlocks with the engaging means comprises a plurality of circumferentially-spaced tabs extending radially from the rim of the cup-shaped retainer. The tabs and the lip portions are aligned when the retainer is in its lock position.

A preferred feature of the invention is actuating means that comprises an arm extending radially from the retainer and a solenoid that engages the arm to rotate the retainer.

In its preferred form, the apparatus comprises a shaft having inner and outer ends and an axially extending opening, and a rod received into the axial opening in the shaft and projecting axially outwardly from the outer end of the shaft. The inner end of the shaft is releasably attached to the flight vehicle. The rod is axially slidable relative to the shaft to release the shaft from the flight vehicle. Flange means extends radially from the shaft adjacent to its outer end. This flange means includes a radial abutting surface facing inwardly for abutting an outer surface of an external store through which the shaft and the rod extend. The flange means also includes engaging means opposite its abutting surface. The apparatus further comprises a generally cup-shaped retainer that has an axial hole extending therethrough through which the rod extends. The retainer includes a rim portion. The retainer has a lock position in which the rim portion interlocks with the engaging means to rotatably secure the retainer to the flange means, and a free position in which the retainer is free to move axially away from the flange means. Spring means is provided for biasing the retainer axially outwardly away from the flange means. Positioning means prevents axial sliding movement of the rod relative to the shaft when the retainer is secured to the flange means. Shoulder means projects radially from the rod axially outwardly of the retainer. Actuating means rotates the retainer from its lock position to its free position to allow the spring means to move the retainer axially outwardly. When the spring means moves the retainer, the retainer contacts the shoulder means and moves the rod axially outwardly to release the shaft and allow the shaft and the external store to separate from the flight vehicle.

A preferred feature of the invention is shoulder means formed by a nut threaded onto the rod and secured against rotation to secure it against axial movement with respect to the rod. Another preferred feature is positioning means formed by a nut threaded onto the rod and secured against rotation to secure it against axial movement with respect to the rod. Still another preferred feature of the invention is flange means which comprises a plate with a hole extending axially therethrough into which the shaft is received.

Another subject of the invention is apparatus for releasably securing two bodies together. According to a basic aspect of the invention, the apparatus comprises a sliding member and support means for supporting one of said bodies in position relative to the other body. The support means includes an elongated member that extends through a first one of said bodies and that has an inner end portion releasably attached to the second body, and an outer end portion. The sliding member is slidable relative to the elongated member to release the elongated member from the second body. Flange means is carried by said outer end portion of the elongated member. The flange means includes an abutting surface facing inwardly for abutting an outer surface of the first body. The flange means also includes engaging means opposite said abutting surface. A retainer has a lock position and a free position. In the lock position, a portion of the retainer interlocks with said engaging means to rotatably secure the retainer to the engaging means. In the free position, the retainer is free to move axially away from the engaging means. Spring means biases the retainer axially away from the engaging means. Positioning means is provided for preventing sliding movement of the sliding member relative to the elongated member when the retainer is secured to the engaging means. Shoulder means is carried by the sliding member in the axial path of the retainer. Actuating means rotates the retainer from its lock position to its free position to allow the spring means to move the retainer axially away from the engaging means. When the spring means moves the retainer, the retainer contacts the shoulder means and moves the sliding member to release the elongated member and allow the elongated member and the first body to separate from the second body.

Apparatus constructed according to the invention reliably secures an external store to a flight vehicle and is releasable upon command to permit the separation of the store from the flight vehicle. Such apparatus has the necessary characteristic of being able to carry the loads experienced by the store, including the shear resulting from acceleration loads and drag-type loads on the store. Before separation, the store is securely attached to the flight vehicle. The separation operation itself can be accomplished quickly and easily. An important advantage of apparatus constructed according to the invention is that it may be thoroughly tested prior to its actual use to insure that separation will be accomplished when desired. Such testing allows the early detection of any defects in the structure or operation of the apparatus so that such defects can be corrected to avoid the serious problems created by a malfunction during actual use of the apparatus.

These and other advantages and features will become apparent from the detailed description of the best mode for carrying out the invention that follows.

BRIEF DESCRIPTION OF THE DRAWINGS

In the drawings, like element designations refer to like parts throughout, and:

FIG. 1 is a vertical sectional view of the preferred embodiment of the apparatus of the invention and portions of a flight vehicle and an external store, showing the retainer in its locked position and the safety pin in place, with some parts shown in elevation.

FIG. 2 is a bottom plan view of the apparatus and external store shown in FIG. 1.

BEST MODE FOR CARRYING OUT THE INVENTION

Figures 3, 4:
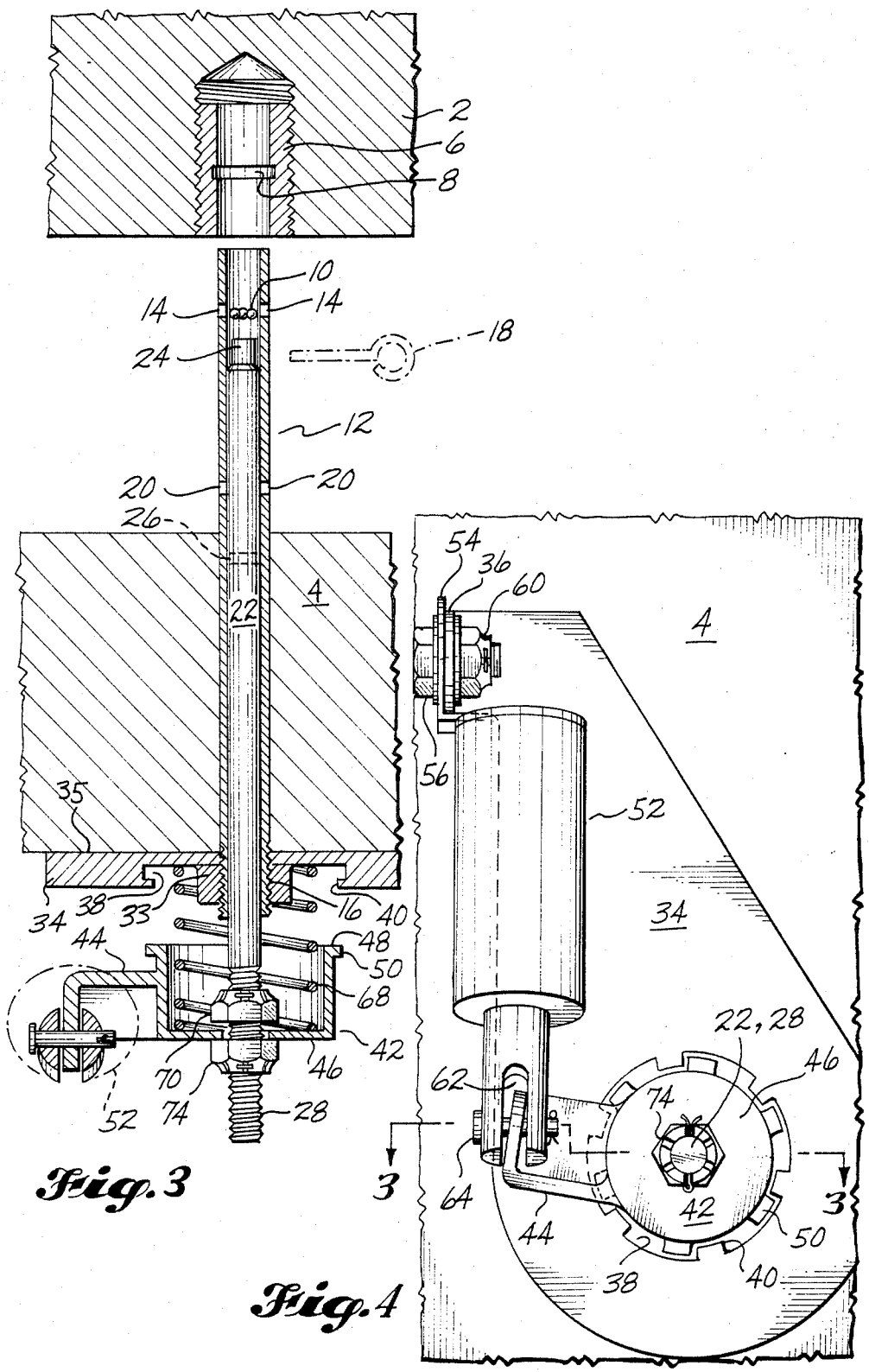
FIG. 3 is like FIG. 1 except that it shows the retainer in its free position, the safety pin removed, and the external store and the apparatus separating from the flight vehicle.
FIG. 4 is a bottom plan view of the apparatus and store as shown in FIG. 3.
Figure 5:
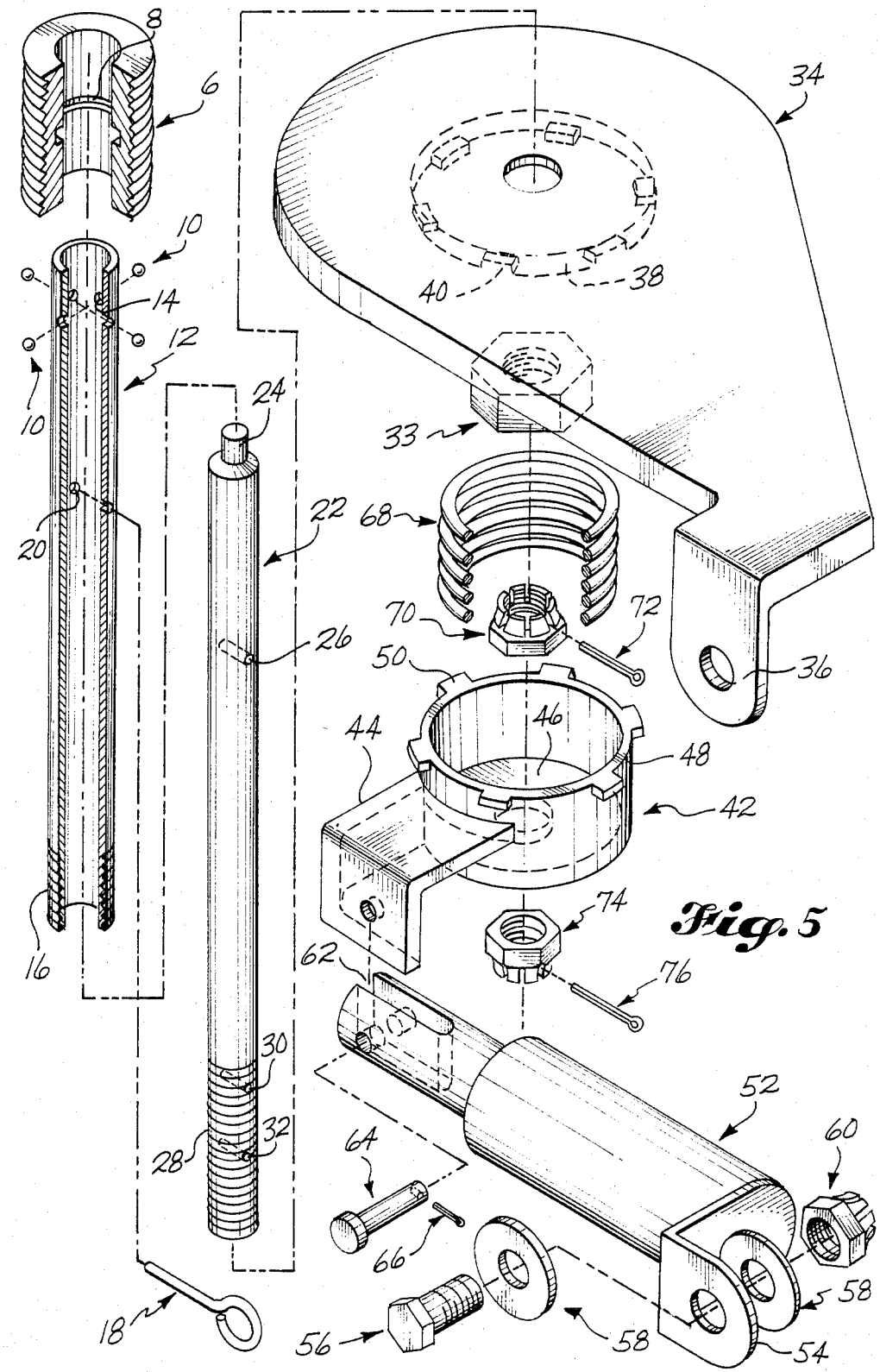
FIG. 5 is an exploded pictorial view of the preferred embodiment of the apparatus of the invention and the apparatus for attaching the shaft to the flight vehicle.

The drawings show apparatus that is constructed according to the invention and that also constitutes the best mode of the invention currently known to the applicant. FIGS. 1 and 2 show the apparatus being used to secure an external store 4 to a flight vehicle 2. In FIGS. 3 and 4, the same installation is shown but the release operation has been carried out and the apparatus and the store 4 are separating from the flight vehicle 2.

The apparatus includes support means for supporting the external store 4 in position relative to the flight vehicle 2. In the preferred embodiment shown in the drawings, the support means includes a shaft 12 in the form of a hollow cylinder with an axially extending opening extending therethrough. The support means also includes flange means in the form of a generally flat plate 34 that extends radially from a threaded outer portion 16 of the shaft 12 adjacent to the outer end of the shaft 12. A nut 33 is threaded onto the shaft 12 outwardly of the plate 34 and urged against plate 34 to secure plate 34 in position. The plate 34 has a radial abutting surface 35 that faces inwardly toward the flight vehicle 2 and that abuts an outer surface of the external store 4. (Elastomeric pressure pads, not shown, may be provided between surface 35 and store 4.) The shaft 12 extends downwardly and outwardly from the flight vehicle 2 and through the store 4 and the plate 34, as shown in FIGS. 1 and 3.

The inner end portion of the shaft 12 is releasably attached to the flight vehicle 2. This attachment may be accomplished by a number of means but is preferably accomplished by a ball-plunger quick release mechanism of a type well-known in the art. As shown in the drawings, a preferred form of this mechanism includes a sleeve 6 that is threadedly secured to a portion of the flight vehicle 2. The sleeve 6 has a circumferential groove 8 extending around its inner surface. The shaft 12 has four holes 14 extending radially through its outer wall. When the shaft 12 is attached to the flight vehicle 2, a hardened steel ball 10 is received into each of the holes 14 and extends into the groove 8 to prevent movement of the shaft 12 with respect to the sleeve 6.

A sliding member or rod 22 is received into the axial opening of the shaft 12 and projects axially outwardly from the outer end of the shaft 12. When the external store 4 is secured to the flight vehicle 2, the upper end of the rod 22 is adjacent to the balls 10 to hold the balls 10 in position in the holes 14 and groove 8 to maintain the attachment between the shaft 12 and the sleeve 6. The rod 22 is axially slidable relative to the shaft 12 in order to permit the release of the shaft 12 from the flight vehicle 2. When the rod 22 slides axially outwardly, a reduced diameter portion 24 at the upper end of the rod 22 moves into alignment with the balls 10 to allow the balls 10 to move radially inwardly and thereby release the connection between the shaft 12 and the sleeve 6. FIG. 1 shows the rod 22 maintaining the attachment between the shaft 12 and the sleeve 6. FIG. 3 shows the positions of the rod 22 and balls 10 after the shaft 12 has been released and separation of the apparatus and the external store 4 from the flight vehicle 2 has been carried out.

In apparatus constructed according to the invention, an outer portion of the support means carries engaging means. In the preferred embodiment, this engaging means is carried by the flange or plate 34 opposite the abutting surface 35. The apparatus also includes a retainer 42 that has a lock position and a free position. In the lock position, a portion of the retainer 42 interlocks with the engaging means to rotatably secure the retainer 42 to the engaging means. In the free position, the retainer 42 is free to move axially away from the engaging means. In the preferred embodiment, the engaging means comprises an annular recess 38 in the surface of the plate 34 opposite the abutting surface 35 and a plurality of radially-extending, circumferentially-spaced projections or lips 40 extending into the recess 38.

The preferred embodiment of the retainer 42, as shown in the drawings, is generally cup-shaped. The rod 22 extends axially into the hollow interior of the retainer 42 and out through an axial hole in the bottom 46 of the retainer 42. A plurality of circumferentially-spaced tabs 50 extend radially from the rim 48 of the cup-shaped retainer 42. When the retainer 42 is in its lock position, the rim 48 of the retainer 42 is positioned in the annular recess 38 and the tabs 50 are aligned with and interlock with the lips 40 to secure the retainer 42 to the plate 34, as shown in FIGS. 1 and 2. The apparatus is provided with positioning means for preventing sliding movement of the rod 22 relative to the shaft 12 when the retainer 42 is in its lock position. The apparatus is also provided with shoulder means carried by the rod 22 in the axial path of the retainer 42. Both the positioning means and the shoulder means are described in more detail below.

The retainer 42 is biased axially outwardly away from the plate 34 by a coil spring 68. The spring 68 is positioned inside the hollow interior of the retainer 42 and surrounds the rod 22. One end of the spring 68 is urged against the inside surface of the bottom 46 of the retainer 42, and the other end of the spring 68 is urged against the inner radial surface of the annular recess 38 in the plate 34. When the retainer 42 is rotated to its free position, the spring 68 moves the retainer 42 axially outwardly to contact the shoulder means on the rod 22.

In order to allow the spring 68 to so move the retainer 42, the apparatus is provided with actuating means for rotating the retainer 42 from its lock position to its free position. In the preferred embodiment shown in the drawings, the actuating means includes a solenoid 52 that is activated to rotate the retainer 42. The solenoid 52 has a mounting lug 54 for mounting the solenoid 52 on the plate 34. The plate 34 has a corresponding lug 36. The two mounting lugs 36, 54 are secured together by means of a bolt 56, two washers 58, and a nut 60. The powering of the solenoid 52 is accomplished by an electrical connection to the flight vehicle 2. An electrical wire (not shown) extends from the solenoid 52 and plugs into an electrical outlet on an outer portion of the flight vehicle 2. When the apparatus and the external store 4 separate from the flight vehicle 2, the electrical wire is pulled out of the outlet in the flight vehicle 2 to sever the electrical connection.

The actuating means also includes an arm 44 that extends radially outwardly from the retainer 42. The outer end of the arm 44 is bent downwardly to extend axially of the retainer 42 and is engaged by the solenoid 52 to rotate the retainer 42. The movable core of the solenoid 52 has an axially extending projection that extends outwardly from the main body of the solenoid 52. This projection has a slot 62 extending radially through its outer end for receiving the bent outer end of the arm 44. A bolt 64 is extended through suitable holes in the projection of the solenoid core and the arm 44 and is secured in place by means of a cotter pin 66. This connection translates axial movement of the core of the solenoid 52 into rotational movement of the retainer 42.

As noted above, the apparatus is provided with positioning means for preventing axial sliding movement of the rod 22 relative to the shaft 12 when the retainer 42 is secured to the plate 34. In the preferred embodiment, this positioning means includes a nut 70 that is threaded onto the threaded outer end portion 28 of the rod 22. The nut 70 is secured against rotation with respect to the rod 22 by means of a cotter pin 72 that extends through suitable holes in the nut 70 and an aligned hole 30 extending radially through the rod 22. With the nut 70 secured against rotation, it is secured against axial movement with respect to the rod 22. The nut 70 is positioned on the rod 22 inside the hollow interior of the retainer 42. When the retainer 42 is in its locked position and the store 4 is attached to the flight vehicle 2, the outer radial surface of the nut 70 abuts the inner surface of the bottom 46 of the retainer 42, and the inner radial surface of the nut 70 abuts the outer radial surface of the shaft 12. Since the diameter of the nut 70 is greater than the diameter of the axial hole in the bottom 46 of the retainer 42, the rod 22 cannot slide axially with respect to the retainer 42 or the shaft 12 as long as the retainer 42 is secured to the plate 34. This arrangement provides a reliable and secure positioning of the rod 22 but is relatively simple and inexpensive to manufacture and use.

Also as noted above, the apparatus further includes shoulder means carried by the rod 22 in the axial path of the retainer 42. The shoulder means projects radially from the rod 22 axially outwardly of the retainer 42. In the preferred embodiment, the shoulder means is formed by a nut 74 threaded onto the threaded outer end portion 28 of the rod 22. This nut 74 is secured by means of a cotter pin 76 that extends through the nut 74 and an aligned hole 32 extending radially through the rod 22. This connection is essentially identical to the connection between the rod 22 and the nut 70. It secures the nut 74 against rotation with respect to the rod 22 to prevent axial movement of the nut 74 with respect to the rod 22.

The apparatus of the preferred embodiment is also provided with a safety pin 18 to prevent axial movement or rotation of the rod 22 with respect to the shaft 12 during the loading operation. The safety pin 18 is received into radial holes 20 in the shaft 12 and an aligned radial hole 26 in the rod 22. The pin 18 has a loop at one end for easy and quick removal.

The loading operation of securing the external store 4 to the flight vehicle 2 is as follows. The shaft 12 and the rod 22, with the safety pin 18 in place, are extended through the external store 4. The safety pin 18 is then removed by grasping its loop and pulling it out of the holes 20, 26. With the safety pin 18 removed, the store 4 is placed into position relative to the flight vehicle 2 and the shaft 12 is attached to the sleeve 6 by means of the ball retention mechanism described above. The rod 22 is moved inwardly to secure the connection between the shaft 12 and the sleeve 6 and the safety pin 18 is reinserted in the holes 20, 26. The plate 34 is installed onto the shaft 12 and secured in place by turning the nut 33 with respect to the shaft 12 and engaging the threaded outer end portion 16 of the shaft 12 in the threaded axial hole of the nut 33. During this operation, a predetermined amount of torque is applied to urge the abutting surface 35 of the plate 34 against the external store 4 and secure the store against any ejection or separation forces, and the safety pin 18 serves to prevent rotation of the shaft 12. With the plate 34 in position, the nut 70 is threaded onto the threaded outer end 28 of the rod 22 and secured in place by means of the cotter pin 72. The retainer 42 with the spring 68 inside are placed into the recess 38 in the plate 34. During this installation, the second nut 74 may be used to aid in compressing the spring 68, and the safety pin 18 serves to restrain rotation of the rod 22. When the rim 48 of the retainer 42 is in the recess 38, the retainer 42 is rotated to interlock the tabs 50 on the rim 48 with the lips 40 extending into the recess 38. With the retainer 42 in its lock position, the solenoid 52 is installed. The mounting lug 54 of the solenoid 52 is secured to the lug 36 on the plate 34. The bent end of the arm 44 on the retainer 42 is secured in the slot 62 in the projecting extension of the movable core of the solenoid 52. The second nut 74 which forms a shoulder on the rod 22 is then rotated to move it a short distance axially outwardly from the bottom 46 of the retainer 42 and the cotter pin 76 is installed to secure the nut 74 in place. Finally, the safety pin 18 is removed prior to the flight of the flight vehicle 2.

This entire assembly process can be easily and quickly accomplished.

The release operation of the external store 4 from the flight vehicle 2 during the flight is as follows. The solenoid 52 is energized to rotate the retainer 42. The rotation of the retainer 42 diengages the interlocking connection between the retainer 42 and the plate 34. The spring 68 is then able to push the retainer 42 axially outwardly to urge the bottom 46 of the retainer 42 against the shoulder surface of the nut 74. After contacting the nut 74, the retainer 42 continues to move axially outwardly under the force of the spring 68 to move the rod 22 axially outwardly. When the upper reduced diameter portion 24 of the rod 22 has moved into alignment with the balls 10, the connection between the shaft 12 and the sleeve 6 is released to allow the shaft 12 and the external store 4 to separate from the flight vehicle 2. Preferably, the store 4 and the apparatus are forcefully separated from flight vehicle 2 after the shaft 12 has been released. The forceful separation, as noted above, may be accomplished by a number of means, including a compressed spring, an explosive charge, compressed gas, or a combination of these means.

Apparatus constructed according to the invention provides a reliable and secure attachment of an external store to a flight vehicle and a simple and reliable means for releasing the store and separating it from the flight vehicle. Apparatus constructed according to the invention is relatively simple and inexpensive to manufacture and to operate. Because of its relatively low cost, it is practical to forcefully separate the apparatus along with the external store 4 when ejection of the external store 4 from the flight vehicle 2 is desired. The separation of the apparatus helps to insure the complete separation of the store 4 and frees the flight vehicle 2, after separation of the external store 4, from any unnecessary projecting elements of the apparatus that would tend to hinder the flight characteristics of the vehicle 2.

It will be obvious to those skilled in the art to which this invention is addressed that the invention may be used to advantage in a variety of situations. Therefore, it is also to be understood by those skilled in the art that various changes, modifications, and omissions in form and detail may be made without departing from the spirit and scope of the present invention as defined by the following claims.

What is claimed is:

1. Apparatus for releasably securing an external store to a flight vehicle, comprising:
    support means for supporting the external store in position relative to the flight vehicle, said support means having an inner end portion releasably attached to the flight vehicle;
    a sliding member that is slidable relative to the support means to release the support means from the flight vehicle;
    engaging means carried by an outer portion of the support means;
    a retainer having a lock position in which a portion of the retainer interlocks with said engaging means to rotatably secure the retainer to the engaging means, and a free position in which the retainer is free to move axially away from the engaging means;
    spring means for biasing the retainer axially away from the engaging means;
    positioning means for preventing sliding movement of the sliding member relative to the support means when the retainer is secured to the engaging means;
    shoulder means carried by the sliding member in the axial path of the retainer; and
    actuating means for rotating the retainer from its lock position to its free position to allow the spring means to move the retainer axially away from the engaging means;
    wherein when the spring means moves the retainer, the retainer contacts the shoulder means and moves the sliding member to release the support means and allow the support means and the external store to separate from the flight vehicle.

2. Apparatus as described in claim 1, in which said outer portion of the support means comprises a radially-extending flange that has a radial abutting surface facing inwardly for abutting an outer surface of the external store; and the engaging means is positioned on said flange opposite said abutting surface.

3. Apparatus as described in claim 1, in which one of said engaging means and said portion of the retainer comprises a plurality of radially-extending, circumferentially-spaced tabs; and the other of said engaging means and said portion of the retainer comprises a plurality of radially-extending, circumferentially-spaced lip portions; said tabs and said lip portions being aligned when the retainer is in its lock position.

4. Apparatus as described in claim 2, in which one of said engaging means and said portion of the retainer comprises a plurality of radially-extending, circumferentially-spaced tabs; and the other of said engaging means and said portion of the retainer comprises a plurality of radially-extending, circumferentially-spaced lip portions; said tabs and said lip portions being aligned when the retainer is in its lock position.

5. Apparatus as described in claim 1, in which the retainer is generally cup-shaped and has a hollow interior into which the sliding member extends.

6. Apparatus as described in claim 1, in which the retainer is generally cup-shaped and has a bottom portion with an axial hole extending therethrough through which the sliding member extends, and the shoulder means is in the axial path of said bottom portion.

7. Apparatus as described in claim 6, in which said outer portion of the support means comprises a radially-extending flange that has a radial abutting surface facing inwardly for abutting an outer surface of the external store; and the engaging means is positioned on said flange opposite said abutting surface.

8. Apparatus as described in claim 7, in which the spring means comprises a coil spring positioned inside the retainer surrounding the sliding member; one end of said coil spring being urged against the bottom portion of the retainer, and the other end of said coil spring being urged against said flange.

9. Apparatus as described in claim 7, in which the engaging means comprises an annular recess and a plurality of radially-extending, circumferentially-spaced lip portions extending into said recess; and the portion of the retainer that interlocks with the engaging means comprises a plurality of circumferentially-spaced tabs extending radially from the rim of the cup-shaped retainer; said tabs and said lip portions being aligned when the retainer is in its lock position.

10. Apparatus as described in claim 1, in which the actuating means comprises an arm extending radially from the retainer, and a solenoid that engages said arm to rotate the retainer.

11. Apparatus for releasably securing two bodies together, comprising:
    support means for supporting one of said bodies in position relative to the other body; said support means including an elongated member that extends through a first one of said bodies and that has an inner end portion releasably attached to the second body, and an outer end portion;
    a sliding member that is slidable relative to the elongated member to release the elongated member from the second body;
    flange means carried by said outer end portion of the elongated member; said flange means including an abutting surface facing inwardly for abutting an outer surface of the first body, and engaging means opposite said abutting surface;
    a retainer having a lock position in which a portion of the retainer interlocks with said engaging means to rotatably secure the retainer to the engaging means, and a free position in which the retainer is free to move axially away from the engaging means;
    spring means for biasing the retainer axially away from the engaging means;

positioning means for preventing sliding movement of the sliding member relative to the elongated member when the retainer is secured to the engaging means;

shoulder means carried by the sliding member in the axial path of the retainer; and actuating means for rotating the retainer from its lock position to its free position to allow the spring means to move the retainer axially away from the engaging means;

wherein when the spring means moves the retainer, the retainer contacts the shoulder means and moves the sliding member to release the elongated member and allow the elongated member and the first body to separate from the second body.

12. Apparatus for releasably securing an external store to a flight vehicle, comprising:

a shaft having inner and outer ends and an axially extending opening, said inner end being releasably attached to the flight vehicle;

a rod received into said opening and projecting axially outwardly from said outer end, said rod being axially slidable relative to the shaft to release the shaft from the flight vehicle;

flange means extending radially from the shaft adjacent to its outer end; said flange means including a radial abutting surface facing inwardly for abutting an outer surface of an external store through which the shaft and the rod extend, and engaging means opposite said abutting surface;

a generally cup-shaped retainer having an axial hole extending therethrough through which the rod extends, and a rim portion; said retainer having a lock position in which said rim portion interlocks with said engaging means to rotatably secure the retainer to the flange means, and a free position in which the retainer is free to move axially away from the flange means;

spring means for biasing the retainer axially outwardly away from the flange means;

positioning means for preventing axial sliding movement of the rod relative to the shaft when the retainer is secured to the flange means;

shoulder means projecting radially from the rod axially outwardly of the retainer; and actuating means for rotating the retainer from its lock position to its free position to allow the spring means to move the retainer axially outwardly;

wherein when the spring means moves the retainer, the retainer contacts the shoulder means and moves the rod axially outwardly to release the shaft and allow the shaft and the external store to separate from the flight vehicle.

13. Apparatus as described in claim 12, in which one of said engaging means and said rim portion comprises a plurality of radially-extending, circumferentially-spaced tabs; and the other of said engaging means and said rim portion comprises a plurality of radially-extending, circumferentially-spaced lip portions; said tabs and said lip portions being aligned when the retainer is in its lock position.

14. Apparatus as described in claim 12, in which the engaging means comprises an annular recess and a plurality of radially-extending, circumferentially-spaced lip portions extending into said recess; and the rim portion comprises a plurality of radially-extending, circumferentially-spaced tabs; said tabs and said lip portions being aligned when the retainer is in its lock position.

15. Apparatus as described in claim 12, in which the spring means comprises a coil spring positioned inside the retainer surrounding the rod; one end of said coil spring being urged against an inner bottom surface of the retainer, and the other end of said coil spring being urged against the flange means.

16. Apparatus as described in claim 12, in which the actuating means comprises an arm extending radially from the retainer, and a solenoid that engages said arm to rotate the retainer.

17. Apparatus as described in claim 12, in which the shoulder means is formed by a nut threaded onto the rod and secured against rotation to secure it against axial movement with respect to the rod.

18. Apparatus as described in claim 17, in which the positioning means is formed by a nut threaded onto the rod and secured against rotation to secure it against axial movement with respect to the rod.

19. Apparatus as described in claim 12, in which the flange means comprises a plate with a hole extending axially therethrough, the shaft extends through the hole in the plate and is threaded adjacent to its outer end, and a nut engages the threaded outer end of the shaft to secure the plate in position.

* * * * *